(12) United States Patent
Asnis

(10) Patent No.: US 7,548,945 B2
(45) Date of Patent: Jun. 16, 2009

(54) SYSTEM, NETWORK DEVICE, METHOD, AND COMPUTER PROGRAM PRODUCT FOR ACTIVE LOAD BALANCING USING CLUSTERED NODES AS AUTHORITATIVE DOMAIN NAME SERVERS

(75) Inventor: Jim Asnis, Santa Cruz, CA (US)

(73) Assignee: Nokia Corporation, Espoo (FI)

( * ) Notice: Subject to any disclaimer, the term of this patent is extended or adjusted under 35 U.S.C. 154(b) by 755 days.

(21) Appl. No.: 11/169,375

(22) Filed: Jun. 29, 2005

(65) Prior Publication Data

US 2006/0235972 A1  Oct. 19, 2006

Related U.S. Application Data

(60) Provisional application No. 60/670,779, filed on Apr. 13, 2005.

(51) Int. Cl.
*G06F 15/16* (2006.01)
(52) U.S. Cl. .............. 709/201; 709/208; 709/223; 709/224; 718/105
(58) Field of Classification Search ............. 709/223, 709/224, 225, 201, 203, 208; 718/105
See application file for complete search history.

(56) References Cited

U.S. PATENT DOCUMENTS

| 5,774,660 | A | | 6/1998 | Brendel et al. |
| 6,006,259 | A | | 12/1999 | Adelman et al. |
| 6,119,143 | A | * | 9/2000 | Dias et al. ................... 709/201 |
| 6,128,279 | A | * | 10/2000 | O'Neil et al. ................ 370/229 |
| 6,249,801 | B1 | * | 6/2001 | Zisapel et al. ................ 718/105 |
| 6,389,448 | B1 | * | 5/2002 | Primak et al. ................ 718/105 |
| 6,665,702 | B1 | * | 12/2003 | Zisapel et al. ................ 718/105 |
| 6,718,359 | B2 | * | 4/2004 | Zisapel et al. ................ 718/105 |
| 6,754,706 | B1 | * | 6/2004 | Swildens et al. ............. 709/225 |
| 7,062,556 | B1 | * | 6/2006 | Chen et al. ................... 709/226 |
| 7,181,524 | B1 | * | 2/2007 | Lele .......................... 709/226 |

(Continued)

FOREIGN PATENT DOCUMENTS

EP        1307018 A1    5/2003

OTHER PUBLICATIONS

*Simple HA/HP Clustering*; 7 pages; available at <http://www.holviala.com/~kimmy/hacks/dncluster/>; (visited Apr. 12, 2005).

*Primary Examiner*—Lashonda T Jacobs
(74) *Attorney, Agent, or Firm*—Alston & Bird, LLP

(57) ABSTRACT

A cluster of devices is provided that shares a domain name and functions as the authoritative name server for the domain. Each device or node in the cluster would typically repeatedly announce status information to all the other nodes in the cluster, such that all the nodes in the cluster are aware of the status information of all other nodes. One of the nodes in the cluster would be designated as a master node. The master node would be assigned an IP address as an authoritative name server, and as such would receive DNS queries for the domain. The master node would select one of the nodes in the cluster to communicate with the client as a result of the DNS query, using the status information of each of the nodes to balance the load on the nodes. The master node would communicate the IP address of the selected node.

22 Claims, 2 Drawing Sheets

U.S. PATENT DOCUMENTS

| | | | |
|---|---|---|---|
| 7,185,096 B2* | 2/2007 | Kalyanavarathan et al. | 709/226 |
| 7,228,359 B1* | 6/2007 | Monteiro | 709/245 |
| 7,376,743 B1* | 5/2008 | Bazzinotti et al. | 709/229 |
| 2001/0037394 A1* | 11/2001 | Yoshimura et al. | 709/228 |
| 2002/0087612 A1* | 7/2002 | Harper et al. | 709/100 |
| 2002/0194335 A1* | 12/2002 | Maynard | 709/225 |
| 2003/0229682 A1 | 12/2003 | Day | |
| 2003/0229697 A1* | 12/2003 | Borella | 709/226 |
| 2004/0024872 A1* | 2/2004 | Kelley et al. | 709/225 |
| 2004/0249939 A1* | 12/2004 | Amini et al. | 709/225 |

* cited by examiner

FIG. 2.
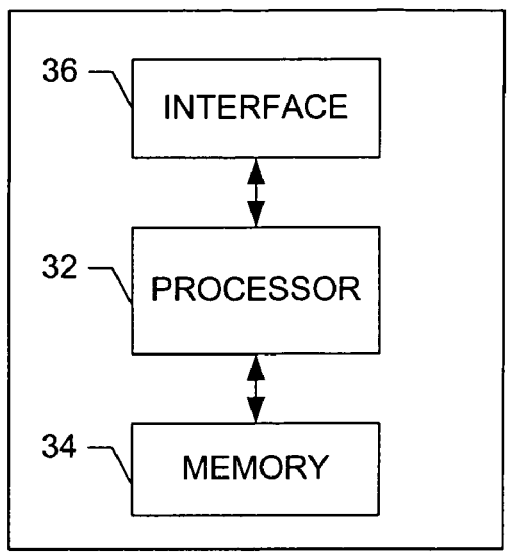
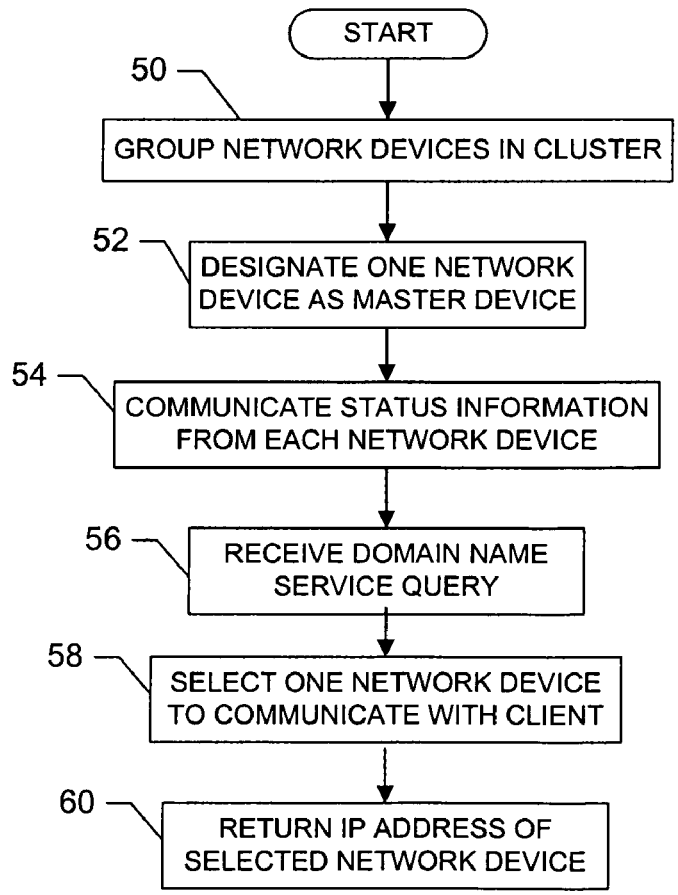
FIG. 3.

SYSTEM, NETWORK DEVICE, METHOD, AND COMPUTER PROGRAM PRODUCT FOR ACTIVE LOAD BALANCING USING CLUSTERED NODES AS AUTHORITATIVE DOMAIN NAME SERVERS

CROSS-REFERENCE TO RELATED APPLICATIONS

The present application claims priority from U.S. Provisional Application Ser. No. 60/670,779 entitled SYSTEM, METHOD, AND COMPUTER PROGRAM PRODUCT FOR ACTIVE LOAD BALANCING USING CLUSTERED NODES AS AUTHORITATIVE DOMAIN NAME SERVERS, filed Apr. 13, 2005, the contents of which are incorporated herein by reference.

FIELD OF THE INVENTION

The present invention generally relates to domain name servers, and more particularly to systems, terminals, and methods for using clustered nodes as authoritative domain name servers.

BACKGROUND OF THE INVENTION

Each device connected to the Internet is identified by an IP address, which is a numerical identifier (e.g., 66.192.134.111) that identifies a particular network on the Internet and a particular device. Domain name service (DNS) is used to associate Internet domain names, such as www.xyz-news.com, with an IP address. DNS allows users (clients) to access other devices (hosts) connected to the Internet by using easily remembered domain names rather than IP addresses. In a typical DNS architecture, a user sends a request (termed a DNS query) to access a particular domain name to a name server provided by the user's Internet service provider (ISP). The ISP name server contains a cross-reference between each domain name and the corresponding IP address. The corresponding IP address contained in the ISP name server is typically that of the authoritative name server (ANS) provided by the domain owner. The ANS contains the IP address(es) of the host device(s) provided by the domain owner to supply information or provide services. These host devices may be, for example, web servers, mail servers, or VPN (virtual private network) gateways. The ISP name server sends the DNS query to the domain's ANS. The ANS then returns the appropriate IP address to the ISP name server, which in turn sends the IP address to the client, enabling the client to communicate directly with the host device over the Internet. (The communication between the client and the host device may be termed an application connection.) The ANS is a separate device from the host device(s) providing the information or services to the client.

One domain name may reference several IP addresses, with each IP address corresponding to a different host device. For example, the website www.xyz-news.com may receive a large number of requests for information and may need to communicate with a large number of clients simultaneously. The providers of the www.xyz-news.com domain may use four web servers, each hosting the same information, in order to handle the large amount of communication traffic the domain receives. In such a situation, the ANS may send the IP addresses of the four devices to the ISP name server, and allow the ISP name server to select which one IP address to send to the client. More typically, the ANS will select one of the four IP addresses to send to the ISP's name server, and the ISP name server will send that one address to the client.

The purpose of having multiple devices providing the same information or services may be to effectively handle many application connections by distributing the application connections over the multiple devices. This may be termed load balancing. In order to balance the load across multiple devices, the ANS typically uses a technique to send the IP address of different host devices in response to different DNS queries to prevent one host device from having to handle all the application connections. One known technique of load balancing DNS queries is termed DNS round-robin. In DNS round-robin, the ANS maintains a predefined, static list of the IP addresses of the multiple devices, and cycles through the static list as each successive DNS query is received. For example, consider the example above in which a domain provider uses four devices, with the four devices having the IP addresses 10.0.0.1, 10.0.0.2, 10.0.0.3, and 10.0.0.4, respectively. When the first DNS query is received from the ISP name server, the ANS returns IP address 10.0.0.1. When the second DNS query is received, the ANS returns IP address 10.0.0.2. When the third DNS query is received, the ANS returns IP address 10.0.0.3. When the fourth DNS query is received, the ANS returns IP address 10.0.0.4. When the fifth DNS query is received, the ANS returns IP address 10.0.0.1. The ANS would continue to cycle through this static list of four IP addresses as DNS queries are received.

The DNS round-robin technique performed by a separate ANS has several shortcomings. If one of the devices referenced in the static list becomes unavailable, the ANS would typically continue to return that device's IP address in response to DNS queries, thereby causing a client to attempt to connect with an unavailable device. The static list would need to be manually changed to remove the failed device's IP address. If a new device is added (e.g., to handle an increased number of application connections), the static list would need to be manually changed to add the new device's IP address. The DNS round-robin technique distributes the application connections across the multiple devices, but does not take into account the duration of a particular connection to a particular device or the relative burden a particular connection may place on a particular device. As such, the DNS round-robin technique may not provide sufficient load balancing in some situations. In the example above, if the clients that were provided with the IP address of device 1 quickly retrieved information from device 1 and then terminated the connections, but the clients that were provided with the IP address of device 2 conducted extensive transfers of data, the load on device 2 could greatly exceed the load on device 1. However, the DNS round-robin technique would continue to return the IP address of device 2 for every fourth DNS query, despite the greater load on device 2.

As such, there is a need for a technique to load balance IP traffic across multiple devices that can easily adjust to adding or removing devices and that can dynamically distribute the traffic based on the relative load on each device.

BRIEF SUMMARY OF THE INVENTION

Generally described, embodiments of the present invention provide an improvement over the known prior art by providing a means by which a cluster of devices shares a domain name and functions as the authoritative name server for the domain. Each device or node in the domain name cluster would repeatedly announce status information, such as each device's existence on the network, current load percentage, number of active connections, and IP address, to all the other nodes in the cluster, such that all the nodes in the cluster are aware of the status information of all other nodes in the cluster. One of the nodes in the cluster would be designated as a master node. The master node would be assigned the IP address of the authoritative name server for that domain, and as such the master node would receive DNS queries for the domain. The master node would select one of the nodes in the cluster (including the master node itself) to communicate with the client as a result of the DNS query, using the status information of each of the nodes to balance the load on the nodes. The master node may use a number of different algorithms to balance the load on the nodes. The master node would communicate the IP address of the selected node to the ISP name server.

In this regard, a system for performing active load balancing using one of a cluster of network devices as an authoritative domain name server comprises a plurality of network devices grouped in a cluster. Each network device may have a different respective device internet protocol (IP) address. One of the network devices may be designated as a master device, wherein the master device is assigned an IP address as the authoritative domain name server. Each network device may be capable of communicating status information to at least the master device in the cluster. The master device may be capable of receiving a domain name service (DNS) query based upon a client request, selecting one of the network devices to communicate with the client based on the status information of each of the network devices, and returning a device IP address of the selected one of the network devices in response to the DNS query.

In one embodiment, each network device selects the status information from the group comprising network device presence, load percentage, number of active connections, and device IP address. The master device may select one of the network devices according to a predefined load balancing algorithm.

In one embodiment, the system may further comprise an additional network device grouped in the cluster. The additional network device may be capable of communicating status information to at least the master device in the cluster such that the additional network device is thereafter considered for selection to communicate with the client.

A different network device may be designated as the master device, such that the authoritative domain name server IP address is transferred to the different designated master device.

In addition to the system for performing active load balancing using clustered network devices as authoritative domain name servers as described above, other aspects of the invention are directed to corresponding network devices, methods, and computer program products for performing active load balancing using one of a cluster of network devices as an authoritative domain name server.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 2 is a schematic block diagram of an entity capable of operating as a terminal, PDSN, server, proxy and/or DNS server, according to embodiments of the invention; and FIG. 3 is a flowchart of a method of performing active load balancing using clustered nodes as authoritative domain name servers, according to one embodiment of the invention.

DETAILED DESCRIPTION OF THE INVENTION

Figure 1:
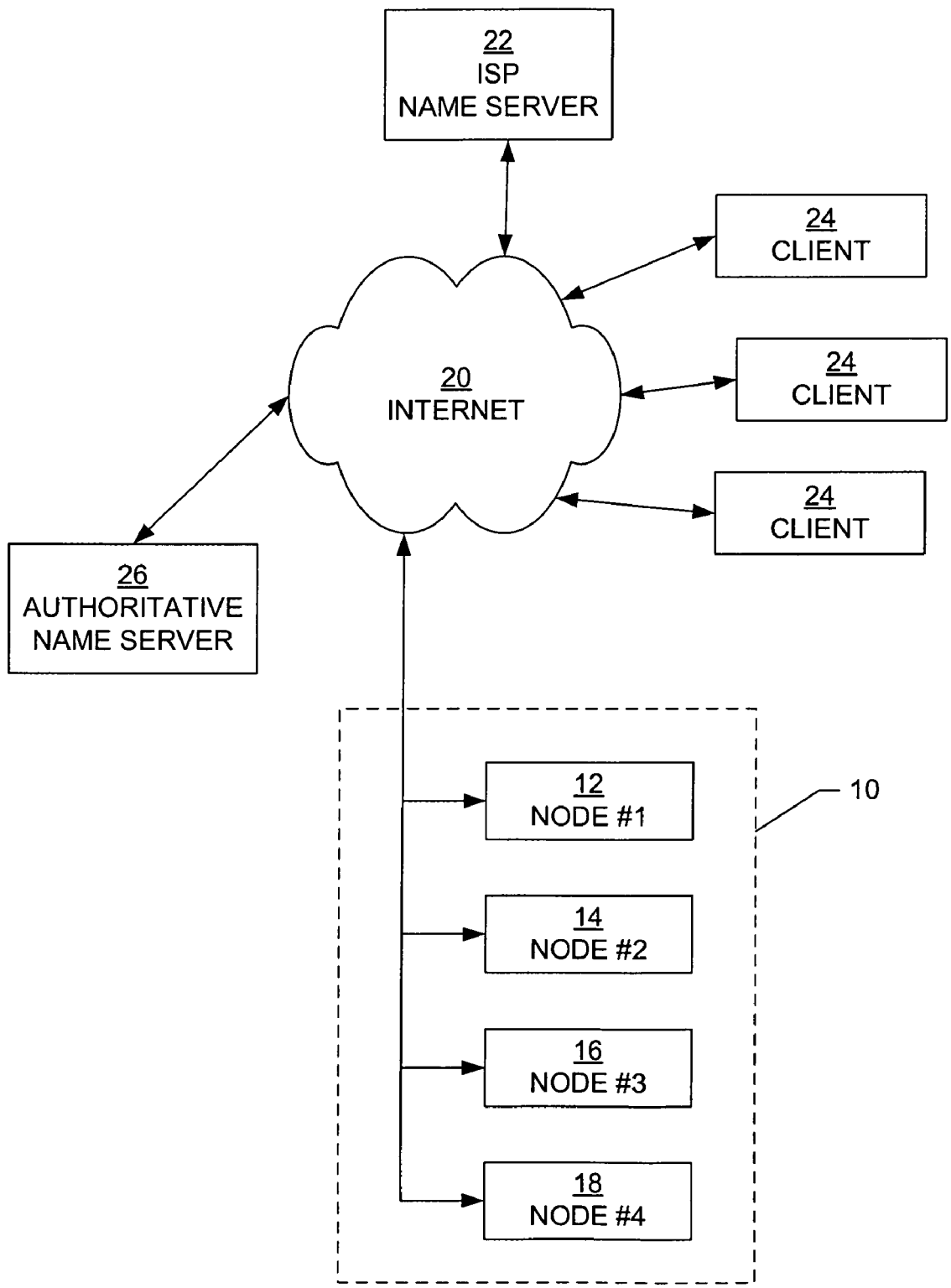
FIG. 1 is a schematic block diagram of system capable of performing active load balancing using clustered nodes as authoritative domain name servers, according to one embodiment of the invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIG. 1, a schematic block diagram of a system capable of performing active load balancing using clustered network devices or nodes as authoritative domain name servers is illustrated, according to one embodiment of the invention. The concept of clusters of network devices is described in U.S. Pat. No. 6,006,259 to Adelman et al., Method and Apparatus for an Internet Protocol (IP) Network Clustering System, the contents of which are incorporated herein in its entirety.

The system of FIG. 1 comprises a cluster 10 of four network devices (or nodes) 12, 14, 16, 18, three client terminals 24, and an ISP name server 22, all connected to the Internet 20, and all of which may be configured as shown in FIG. 2. The nodes 12, 14, 16, 18 may be, for example, web servers or VPN gateways. The client terminals 24 may comprise any of a number of different terminals, systems, devices or the like, whether mobile or not, including, for example, a personal computer, computer workstation, mobile telephone, portable digital assistant (PDA), pager, laptop computer or smart card. The client terminals would typically be connected to the Internet 20 and, in turn, to a domain, via various access networks such as a cellular network or a local area network (LAN).

All nodes in a cluster would typically be functionally equivalent. For example, the nodes 12, 14, 16, 18 may all be web servers hosting identical information, such that any client terminal may be directed to any node and access the same information regardless of which node the client terminal accesses. Four nodes are shown in FIG. 1 for illustrative purposes, however a cluster may comprise any number of nodes.

Each node has a different IP address but shares the same domain name. Additionally, one node is designated as master node, and is assigned the IP address of the ANS for that domain, such that all DNS queries for the domain are received by the master node. Any node in the cluster is generally capable of functioning as the master node. If master node responsibility is transferred from one node in the cluster to another node in the cluster, the ANS IP address is transferred along with the master node responsibility such that the previous master node is no longer assigned the ANS IP address and the new master node is assigned the ANS IP address.

When a client terminal 24 desires to access the cluster's domain, the domain name is specified by the client terminal. In the illustrated embodiment, the DNS query containing the domain name is sent via the Internet 20 to the ISP name server 22. The ISP name server 22 has a cross-reference table of domain names and the IP address of the ANS associated with each domain name. The ISP name server 22 sends the DNS query via the Internet 20 to the ANS IP address of the specified domain. Because the master node is assigned the ANS IP address, the DNS query is received by the master node. That the DNS query is received by a master node of a cluster functioning as an ANS, rather than by a typical separate ANS, is transparent to the client terminal 24 and the ISP name server 22. As such, no changes are required to the existing DNS query process.

Each node in the cluster 10 would repeatedly announce status information to all the other nodes in the cluster, thereby enabling all of the nodes in the cluster to know the status information of all other nodes in the cluster. Alternatively, each node could unicast the status information to the master node only, or the master node could poll the other nodes to obtain the status information. This status information may include, for example, the presence of the node on the network, the node's current load percentage, the number of active connections being supported by the node, and the node's IP address. This announcement of status information by each node occurs repeatedly, such as once per second. The status information may be sent using a multicast packet protocol. When the master node receives a DNS query, the master node would select one of the nodes in the cluster to communicate with the client terminal as a result of the DNS query. Because the master node functionality is performed by one of the nodes in the cluster, the master node may select itself as the device to communicate with the client terminal in response to a DNS query. The master node uses the status information of each of the nodes to dynamically balance the load on the nodes. Many different algorithms may be used by the master node to balance the load on the nodes. The master node may use a weighted round-robin algorithm, in which the DNS queries may typically be routed in a round-robin fashion to each node in turn, but may be routed out of turn if some nodes are more heavily loaded than other nodes. For example, if each node announces a load percentage and the load percentage of node #3 is more than a predefined percentage higher than the average load percentage of the other nodes, the master load may stop sending the IP address of node #3 in response to new DNS queries until the load percentage of node #3 is decreased to a level within the predefined percentage of the average load percentage of the other nodes. Alternatively, if each node announces a number of active connections and the number of active connections of node #4 is more than a predefined percentage higher than the average number of active connections of the other nodes, the master node may stop sending the IP address of node #4 in response to new DNS queries until the number of active connections of node #4 is decreased to a level within the predefined number of average active connections of the other nodes.

After the master node selects one of the nodes to communicate with the client terminal as a result of the DNS query, the master node would communicate the IP address of the selected node to the ISP name server. The ISP name server would communicate the IP address of the selected node to the client terminal, such that the client terminal may communicate directly with the selected node. That the IP address of the selected node is provided by a master node of a cluster functioning as an ANS, rather than by a typical separate ANS, is transparent to the client terminal 24 and the ISP name server 22.

The system of FIG. 1 that is, capable of performing active load balancing using clustered network devices or nodes as authoritative domain name servers provides several advantages over the known system using a separate ANS cycling round-robin through a static list of IP addresses, in addition to the dynamic load balancing discussed above. The system of the exemplary embodiment of FIG. 1 allows dynamic scaling, such that new nodes may be added to the cluster without requiring configuration changes. When a new node is added to a cluster, the new node announces its presence to the other nodes in the cluster and an authentication procedure is performed. When the new node is authenticated, the master node will begin using the new node's IP address to respond to DNS queries whenever appropriate according to the load balancing algorithm used by the master node.

The system of FIG. 1 can dynamically respond to the removal of nodes from the cluster, either because of failure of a node or because the node is removed for maintenance. If a node fails, the node will no longer announce status information to the other nodes. Because the master node is not receiving status information from the failed node, the master node will stop sending the IP address of the failed node in response to DNS queries. Whatever client terminal connections exist with the failed node will be terminated when the node fails, but no new connections will be attempted by client terminals with the failed node.

If a node needs to be removed for maintenance, the node is removed from the cluster but any existing client terminal connections with the removed node are maintained. As above, the removed node will no longer announce status information to the other nodes. Because the master node is not receiving status information from the removed node, the master node will stop sending the IP address of the removed node in response to DNS queries. When all the existing client terminal connections have been terminated by the client terminals, such as upon the natural completion of the respective session, the removed node will become idle and maintenance can then be performed. Alternatively, the active connections to the node to be removed for maintenance may be transferred to another node.

In an alternative embodiment of the invention, the system may also comprise a separate ANS 26 for a higher level domain, with the separate ANS redirecting DNS queries for a lower level domain to a cluster of devices that handle the application connections and function as the ANS for the lower level domain. For example, the client terminal 24 may request a connection to the domain www.finance.xyz-news.com. The ISP name server would typically look to the higher level domain (i.e., xyz-news.com) to determine the ANS for that domain. The ANS for the higher level domain may be a separate ANS 26, such that the ISP name server 22 would send the DNS query to the separate ANS 26. The separate ANS 26 would typically look to the entire domain name (www.finance.xyz-news.com) and determine that the cluster 10 functions as the ANS for the lower level domain. The separate ANS 26 would then typically send a re-direct message to the ISP name server to indicate that the DNS query should be sent to the cluster 10. In response to the re-direct message, the ISP name server would send a DNS query to the cluster 10. The cluster 10 would then determine the appropriate node to handle the requested application connection, as discussed above, and send that node's IP address to the ISP name server.

Referring now to FIG. 2, a block diagram of an entity capable of operating as a client terminal 24, node 12 and/or name server 22, is shown in accordance with one embodiment of the present invention. Although shown as separate entities, in some embodiments, one or more entities may support one or more of a client terminal, node and/or name server, logically separated but co-located within the entit(ies). As shown, the entity capable of operating as a client terminal, node, and/or name server can generally include means, such as a processor 32 connected to a memory 34, for controlling operation of the entity. The memory can comprise volatile and/or non-volatile memory, and typically stores content, data or the like. For example, the memory typically stores content transmitted from, and/or received by, the entity. Also for example, the memory typically stores software applications, instructions or the like for the processor to perform steps associated with operation of the entity in accordance with embodiments of the present invention.

The processor 32 can also be connected to at least one interface 36 or other means for transmitting and/or receiving data, content or the like. The interface(s) can include a means for communicating in accordance with any one or more of a number of different communication techniques. In this regard, the interface(s) can include means for communicating in accordance with any of a number of wireline and/or wireless communication techniques. For example, the interfaces can generally include an RF module capable of communicating in accordance with an RF communication technique, and can more particularly include a Bluetooth module, WLAN module and/or UWB module capable of communicating in accordance with a Bluetooth, WLAN and/or UWB communication technique, respectively. Additionally or alternatively, the interfaces can include means for communicating in accordance with 1G, 2G, 2.5G and/or 3G communication techniques.

Referring now to FIG. 3, a flowchart of a method of performing active load balancing using clustered nodes as authoritative domain name servers is illustrated, according to one embodiment of the invention. A plurality of network devices or nodes are typically grouped in a cluster. See block 50. As discussed above, these grouped network devices would typically be functionally equivalent, and any number of devices can be grouped into a cluster. Each device would typically have a network device IP address. One network device in the cluster may be designated as a master device. See block 52. The designated master device would typically be assigned the IP address of the authoritative domain name server, in addition to the master device's device IP address. The designation of master device may be transferred as necessary from one device to another device. When the master device designation is transferred, the IP address of the authoritative domain name server would also typically be transferred to the newly designated master device.

The master device would typically receive status information from each network device in the cluster. See block 54. As discussed above, the status information may include the presence of the network device on the network, the network device's current load percentage, the number of active connections being supported by the network device, and the network device's IP address. Because the status information is received repeatedly by the master device, the master device would typically know how many network devices are active in the cluster. The master device can also react to the addition or removal of a network device from the cluster without the reconfiguration typically required in an authoritative name server when a node is added or removed.

Because the master device would typically be assigned the IP address of the authoritative domain name server, the master device would receive any DNS queries for that domain. See block 56. The master device would typically select one of the network devices in the cluster to communicate with a client in response to the DNS query. See block 58. The master device would typically use the status information to select one of the network devices such that the load of the network devices is balanced. Many different load balancing algorithms may be used, such as the weighted round robin technique discussed above. The master device would typically only select a network device from which the master device has received status information as expected. This would prevent the master device from selecting a network device that has failed or has otherwise been removed from the cluster. The IP address of the selected network device would be returned by the master device to the client, via the ISP name server. See block 60. The ISP name server would provide the IP address to the client such that the client can then communicate with the selected network device.

According to one exemplary aspect of the invention, the functions performed by one or more of the entities of the system, such as node 12, may be performed by various means, such as hardware and/or firmware, including those described above, alone and/or under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

In this regard, FIG. 3 is a flowchart of methods and program products according to the invention. It will be understood that each step of the flowchart, and combinations of steps in the flowchart, can be implemented by computer program instructions. These computer program instructions may be loaded onto a computer or other programmable apparatus to produce a machine, such that the instructions which execute on the computer or other programmable apparatus create means for implementing the functions specified in the flowchart step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart step(s).

Accordingly, steps of the flowchart support combinations of means for performing the specified functions, combinations of steps for performing the specified functions and program instruction means for performing the specified functions. It will also be understood that each step of the flowchart, and combinations of steps in the flowchart, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system comprising:
    a plurality of network devices grouped in a cluster, wherein each network device has a different respective device internet protocol (IP) address; wherein one of the network devices is designated as a master device;

wherein the master device is assigned an IP address corresponding to an IP address of an authoritative domain name server; wherein each network device is configured to communicate status information to at least the master device in the cluster;

wherein the master device is configured to receive a domain name service (DNS) query based upon a client request, select one of the network devices to communicate with the client based on the status information of each of the network devices, and return a device IP address of the selected one of the network devices in response to the DNS query.

2. The system of claim 1, wherein each network device selects the status information from the group comprising network device presence, load percentage, number of active connections, and device IP address.

3. The system of claim 1, wherein the master device selects one of the network devices according to a predefined load balancing algorithm.

4. The system of claim 1, further comprising an additional network device grouped in the cluster, the additional network device configured to communicate status information to at least the master device in the cluster such that the additional network device is thereafter considered for selection to communicate with the client.

5. The system of claim 1, wherein a different network device may be designated as the master device, such that the authoritative domain name server IP address is transferred to the different designated master device.

6. An apparatus comprising:
a processor configured to receive status information from each of a plurality of network devices grouped in a cluster; the processor further configured to receive a domain name service (DNS) query based upon a client request; select one network device from among the cluster of the network devices including the network device itself to communicate with a client based on the status information of each of the network devices, and return a device internet protocol (IP) address of the selected one of the network devices in response to the DNS query,
wherein the network device is designated as a master device and is assigned an IP address corresponding to an IP address of an authoritative domain name server.

7. The apparatus of claim 6, wherein the processor receives status information selected from the group comprising network device presence, load percentage, number of active connections, and device IP address.

8. The apparatus of claim 6, wherein the processor selects one of the network devices according to a predefined load balancing algorithm.

9. The apparatus of claim 6, wherein the processor is further configured to receive status information from an additional network device grouped in the cluster and then considering the additional network device for selection to communicate with the client.

10. The apparatus of claim 6, wherein the processor no longer receives status information from a network device removed from the cluster, wherein the processor is further configured to select one of the network devices other than the removed network device to communicate with the client.

11. The apparatus of claim 6, wherein the processor is further configured to transfer master device designation to a different network device, such that the authoritative domain name server IP address is transferred to the different designated master device.

12. A method comprising:
designating one network device, among a plurality of network devices grouped in a cluster, as a master device, wherein the master device is assigned an internet protocol (IP) address corresponding to an IP address of an authoritative domain name server;
communicating status information from each network device to at least the master device in the cluster;
receiving a domain name service (DNS) query based upon a client request;
selecting one of the network devices to communicate with the client, based on the status information of each of the network devices; and
returning a device IP address of the selected one of the network devices in response to the DNS query.

13. The method of claim 12, wherein the status information is selected from the group comprising network device presence, load percentage, number of active connections, and device IP address.

14. The method of claim 12, wherein the one of the network devices is selected according to a predefined load balancing algorithm.

15. The method of claim 12, further comprising:
grouping an additional network device in the cluster, wherein the additional network device communicates status information to at least the master device in the cluster such that the additional network device is thereafter considered for selection to communicate with the client.

16. The method of claim 12, further comprising:
removing one of the plurality of network devices from the cluster wherein the removed network device no longer communicates status information to at least the master device in the cluster such that the removed network device is no longer eligible to be selected to communicate with the client.

17. The method of claim 12, further comprising:
designating a different network device as the master device, such that the authoritative domain name server IP address is transferred to the different designated master device.

18. A computer program product, the computer program product comprising at least one computer-readable storage medium having computer-readable program code portions stored therein, the computer-readable program code portions comprising:
a first executable portion configured to designate one network device, among a plurality of network devices grouped in a cluster, as a master device and assign the master device an internet protocol (IP) address that corresponds to an IP address of an authoritative domain name server;
a second executable portion configured to communicate status information from each of the plurality of network devices to at least the master device;
a third executable portion configured to communicate a domain name service (DNS) query, based upon a client request, to the master device;
a fourth executable portion configured to select one network device from among the cluster of the network devices to communicate with a client based on the status information of each of the network devices; and
a fifth executable portion configured to return the device IP address of the selected one of the network devices in response to the DNS query.

19. The computer program product of claim 18, wherein the second executable portion receives status information selected from the group comprising network device presence, load percentage, number of active connections, and device IP address.

20. The computer program product of claim 18, wherein the fourth executable portion selects one of the network devices according to a predefined load balancing algorithm.

21. The computer program product of claim 18, wherein the second executable portion is further configured to communicate status information from an additional network device in the cluster to the master device, such that the fourth executable portion considers the additional network device for selection to communicate with the client.

22. The computer program product of claim 18, wherein a network device removed from the cluster is no longer considered by the fourth executable portion for selection to communicate with the client if the second executable portion no longer communicates status information from the removed network device.

* * * * *